(12) United States Patent
Schaefer et al.

(10) Patent No.: US 8,228,637 B2
(45) Date of Patent: Jul. 24, 2012

(54) BIAS TECHNIQUES FOR MAGNETIC TAPE MEDIA

(75) Inventors: Wayne P. Schaefer, North St. Paul, MN (US); Thu D. DePuydt, Woodbury, MN (US); Bruce H. Edwards, White Bear Lake, MN (US); Gregory W. Visich, Woodbury, MN (US)

(73) Assignee: Imation Corp., Oakdale, MN (US)

( * ) Notice: Subject to any disclaimer, the term of this patent is extended or adjusted under 35 U.S.C. 154(b) by 1085 days.

(21) Appl. No.: 11/810,621

(22) Filed: Jun. 6, 2007

(65) Prior Publication Data

US 2008/0304180 A1 Dec. 11, 2008

(51) Int. Cl.
*G11B 15/10* (2006.01)
(52) U.S. Cl. ........................................ 360/137
(58) Field of Classification Search ............... None
See application file for complete search history.

(56) References Cited

U.S. PATENT DOCUMENTS

| 5,053,893 | A | * | 10/1991 | Hayata et al. ............... 360/66 |
| 5,132,860 | A | * | 7/1992 | Von Stein ................... 360/118 |
| 5,272,573 | A | * | 12/1993 | McClure ..................... 360/17 |
| 5,581,417 | A | * | 12/1996 | Bigelow ...................... 360/17 |
| 6,822,827 | B1 | | 11/2004 | Heinz et al. |
| 6,970,312 | B2 | | 11/2005 | Yip et al. |

* cited by examiner

*Primary Examiner* — David D Davis
(74) *Attorney, Agent, or Firm* — Shumaker & Sieffert, P.A.

(57) ABSTRACT

The disclosure is directed to a method for creating a remanence magnetization on a magnetic tape medium. The magnetic tape is first substantially demagnetized, e.g., erased, by an erasure unit having multiple magnetic elements of alternating polarity. The erased magnetic tape is then passed by a bias magnet that creates a remanence magnetization on the magnetic tape. The remanence magnetized magnetic tape is then passed through a servo write head that writes servo patterns to the remanence magnetized magnetic tape. The bias magnet may be housed within the erasure unit or within a bias unit, and the distance between the bias magnet and the tape path of the magnetic tape may be adjustable to create the desired remanence magnetization on the magnetic tape. The remanence magnetization created on the magnetic tape may be greater than 20 percent to reduce defects in the servo pattern written to the magnetic tape.

20 Claims, 7 Drawing Sheets

BIAS TECHNIQUES FOR MAGNETIC TAPE MEDIA

TECHNICAL FIELD

The invention relates to magnetic storage media, and, in particular, to the creation of servo patterns on magnetic tape media.

BACKGROUND

Magnetic tape media is often used for storage and retrieval of data, and comes in many widths and lengths. Magnetic tape media remains an economical medium for storing large amounts of data. For example, magnetic tape cartridges, or large spools of magnetic tape, are used to back up large amounts of data for large computing centers. Magnetic tape cartridges also find application in the backup of data stored on smaller computers such as desktop or laptop computers.

During the lifespan of magnetic tape, it may be necessary or desirable to erase the tape. For example, an erasing process is typically implemented during the fabrication of magnetic tape media. Typically, magnetic tape is erased after being coated, cut and spooled, and then servo tracks are written on the magnetic tape after it has been erased. At this stage, there typically is no data stored on the tape. Nevertheless, it is desirable to perform erasure prior to servo writing to ensure that the servo patterns can be properly written.

In addition, magnetic tape may also be erased later in the lifespan of the magnetic tape. For example, the tape may be erased after being recorded, thus putting the tape into a condition to be re-recorded. In this document, the term "erasure" refers to a process or an apparatus that returns the magnetic tape or a portion thereof to a substantially demagnetized condition, i.e., a condition in which the fields of the individual magnetic particles on the tape substantially cancel out. Often the demagnetized condition is one in which the individual magnetic particles have substantially no ordered magnetization pattern.

Erasure is typically accomplished by subjecting the magnetic tape to a magnetic field of sufficient magnitude to saturate the magnetic particles on the tape. The polarity of the applied field is then reversed and the magnitude of the applied field is reduced by some small amount. The polarity of the applied field is then reversed again and the magnitude is again reduced. The process of reducing the magnitude of the applied field and reversing the polarity of the applied field continues until the magnitude reaches zero, or some finite value which is determined to be sufficiently small as to have no further effect.

One common method of erasing involves subjecting an entire reel of tape to a field which is generated by an alternating electric current. The alternating current produces the reversal of magnetic field, and the decay in field strength is provided either by reducing the magnitude of the applied current or by physically removing the media from the erasing field.

Another method of erasing implements a specially designed recording head driven with alternating current. As the tape passes by the head, it is erased by the alternating field generated by the recording head. In order to leave the media in a demagnetized state, each point of the media is subjected to several reversals of field while passing by the head. The frequency of the erasing field is sufficiently high to produce the required number of reversals. The strength of the field, as seen by the tape, decays as the tape moves away from the head. These conventional methods of erasing magnetic tape may require specially designed degaussing chambers or recording heads.

SUMMARY

In general, the disclosure is directed to a system and method for creating a remanence magnetization, i.e., a remanence, on a magnetic tape medium. The magnetic tape is first substantially demagnetized, e.g., erased, by an erasure unit having multiple magnetic elements of alternating polarity. The erased magnetic tape is then passed by a bias magnet that creates the remanence on the full width of the magnetic tape. The biased magnetic tape is then passed through a servo write head that writes servo patterns to the biased magnetic tape.

The bias magnet may be housed within the erasure unit or within a bias unit, and the distance between the bias magnet and the tape path of the magnetic tape may be adjustable to alter the magnetic field affecting the tape path and create the desired remanence on the magnetic tape. The remanence created on the magnetic tape may be at least 20 percent to reduce defects in the servo pattern written to the magnetic tape. In other examples, the remanence may be at least 30 percent, or preferably at least 40 percent.

In one embodiment, the invention is directed to a method including substantially demagnetizing a magnetic tape medium and creating a remanence magnetization on a full width of the magnetic tape medium. The method also includes writing a plurality of servo patterns on the remanence magnetized magnetic tape medium.

In another embodiment, the invention is directed to a servo writing system including a magnetic tape erasure unit positioned along a tape path that substantially demagnetizes a magnetic tape medium and a bias magnet that creates a remanence magnetization on a full width of the magnetic tape medium. The system also includes a servo write head positioned along the tape path that writes servo tracks on the remanence magnetized magnetic tape medium.

In another embodiment, the invention is directed to a magnetic tape medium including a plurality of servo patterns and a plurality of data bands. Each of the plurality of data bands is disposed between two of the plurality of servo patterns, and each of the plurality of data bands has a remanence magnetization of at least 20 percent.

As described herein, the invention may provide one or more advantages. First, creating a remanence magnetization of a magnetic tape medium may increase the servo pattern amplitude range and thereby increase the quality of recorded servo patterns. The increased servo pattern amplitude range may also decrease servo pattern defects in the magnetic tape when compared to magnetic tape without a remanence. In addition, the system may allow for the adjustment of the bias magnet position to create a remanence of desired amplitude either manually or automatically.

The details of one or more embodiments of the invention are set forth in the accompanying drawings and the description below. Other features, objects, and advantages of the invention will be apparent from the description and drawings, and from the claims.

DETAILED DESCRIPTION

The disclosure is directed to a system and technique for creating a remanence magnetization, i.e., a remanence, on a magnetic tape medium. The system includes a bias magnet that is positioned near the tape path of the magnetic tape. The bias magnet may be positioned at a desired distance to the tape path such that the magnetic field from the bias magnet creates a remanence over the full width of the magnetic tape. In some cases, an adjustable stage may be attached to the bias magnet to correctly position the bias magnet according to the desired remanence. The remanence created on the full width of the magnetic tape may be greater than 20 percent, greater than 30 percent, or preferably greater than 40 percent. The remanence percentage is the percent of the total magnetization possible of the particles of the magnetic tape. The biased magnetic tape may improve servo pattern quality by increasing the amplitude range of the servo patterns. In addition, the remanence may reduce servo pattern defects when compared to magnetic tape without remanence.

In addition to the bias magnet, the system may include additional components to complete the entire servo pattern writing process. The magnetic tape may first be substantially demagnetized, e.g., erased, by an erasure unit having multiple magnetic elements of alternating polarity. The erased magnetic tape is then passed by the bias magnet that creates a remanence on the full width of the magnetic tape. The biased magnetic tape is then passed through a servo write head that writes servo patterns to the biased magnetic tape. In this manner, the entire system may be used to create servo patterns on a biased magnetic tape before any data is ever written to the magnetic tape or at any time during the life cycle of the magnetic tape. The remanence remains on each of the data bands until data is written to the data bands.

The remanence may be created on the full width of the magnetic tape with the bias magnet in one of multiple configurations. In one example, the bias magnet may be housed within a bias unit that is located along the tape path between the erasure unit and the servo write head. The bias unit may allow precise control of the magnetic field applied to the magnetic tape when creating the remanence on the magnetic tape. In another example, the bias magnet may be included as a magnetic element at the end of the erasure unit to reduce the number of components of the system and overall size of the system.

Figure 1:
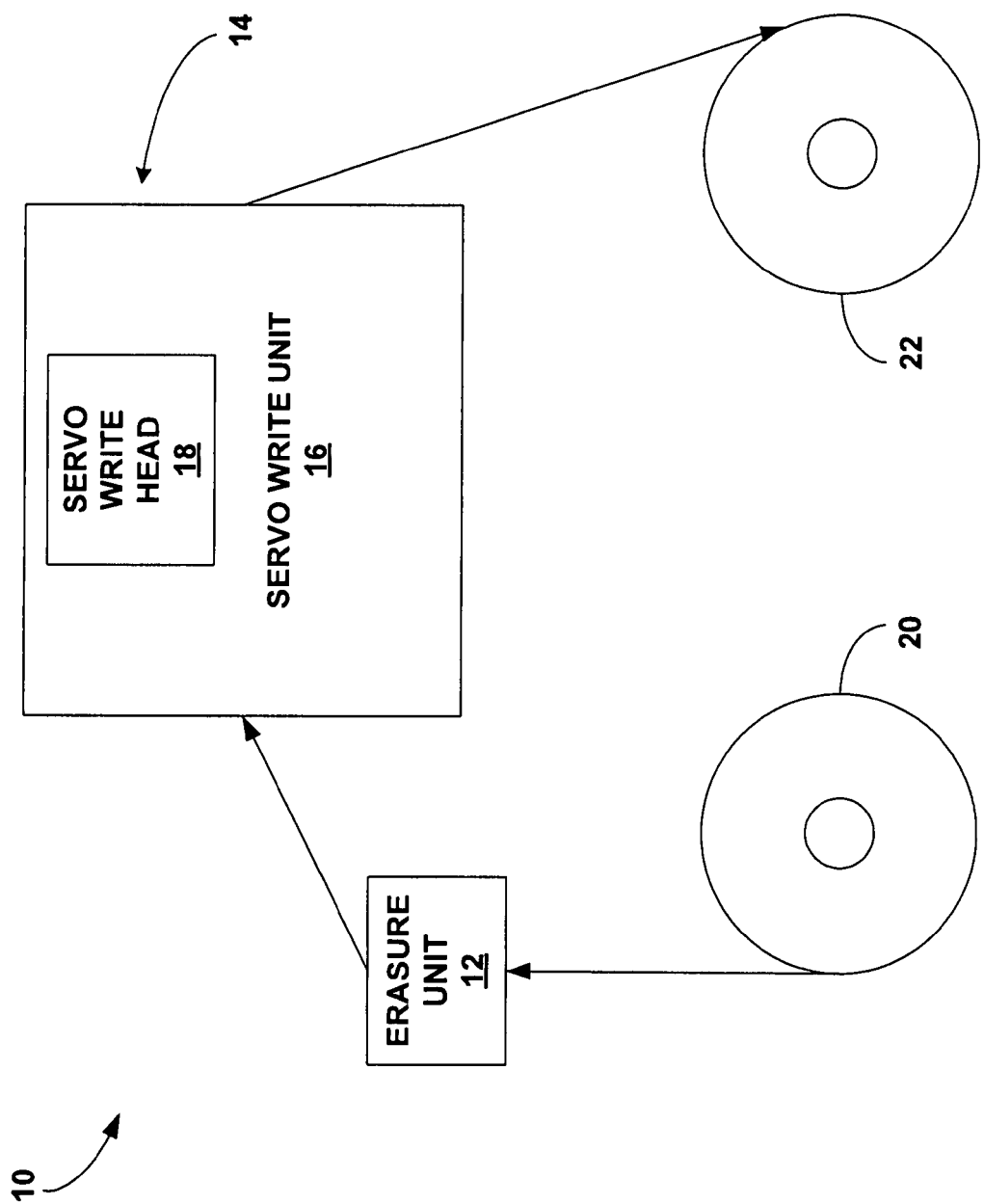
FIG. 1 is a conceptual illustration of an example servo writing system that creates a remanence on magnetic tape media.

FIG. 1 is a conceptual illustration of an example servo writing system 14 that creates a remanence on magnetic tape media. As shown in FIG. 1, system 10 includes servo writing system 14 in conjunction with erasure unit 12 and spools 20 and 22. System 10 creates a remanence to magnetic tape from spool 20 before writing servo patterns on the magnetic tape with servo write head 18. The magnetic tape feeds out of spool 20 and through erasure unit 12. Erasure unit 12 includes a plurality of magnetic elements that substantially demagnetize, e.g., degauss, the magnetic tape from spool 20. In addition, one of the magnetic elements of erasure unit 12 is a bias magnet that creates a remanence on the magnetic tape as the magnetic tape leaves erasure unit 12.

The biased magnetic tape subsequently feeds into servo writing unit 16. Servo writing unit 16 may implement one or more servo write heads 18 to write servo patterns on the magnetic tape. The magnetic tape then feeds out of servo writing unit 16, and is re-spooled onto spool 22. While the written servo patterns may remove the remanence from the magnetic tape over the respective servo track areas of the magnetic tape, the remanence may still be located on the data bands until data is written to the data bands. Servo writing system 14 may also include various motors (not shown) and guides (not shown) for moving the tape through servo writing system 14, various vacuum units (not shown) to ensure that the magnetic tape is taut throughout the servo writing system 14, and various cleaning stations (not shown) to wipe the magnetic tape clean. In addition, system 10 may include various motors attached to spools 20 and/or 22, guides to keep the magnetic tape aligned in the tape path, and housings to support the operation of system 10.

The remanence created on the magnetic tape may be provided to improve the quality of servo patterns written on the magnetic tape. In general, system 10 may create a remanence of at least 20 percent on the full width of the magnetic tape. In other embodiments, system 10 may create a remanence of at least 30 percent on the magnetic tape. Preferably, system 10 may create a remanence of at least 40 percent on the magnetic tape. The amount of remanence created on the magnetic tape is a function of the strength of the magnetic field applied to the magnetic tape by the bias magnet. In some embodiments, erasure unit 12 may include an adjustable stage that adjusts the distance between the bias magnet and the magnetic tape. In this manner, the amount of remanence created on the magnetic tape may be easily defined by the manufacture of erasure unit 12 or the user of system 10.

The remanence percentage is the percent of the total magnetization possible of the particles of the magnetic tape, such that 100 percent magnetization may be equivalent to fully magnetized particles in one direction in the magnetic tape. In other words, each particle of the magnetic tape may be magnetically oriented in a direction. After being subjected to a magnetic field, each particle will be at least partially magnetized according to the strength and polarity of the magnetic field. 100 percent magnetization would mean that every particle is magnetized fully in one direction, e.g., a +1 direction or the opposing −1 direction. Zero percent magnetization would indicate that the particle alignment is random and particles are aligned in any direction between the +1 and −1 direction. Therefore, 40 percent magnetization would indicate that the particles are aligned 40 percent towards the +1 direction, for example.

This partial magnetization, or remanence, allows for a greater amplitude difference between the discrete digital values used for the servo patterns. With no remanence on the magnetic tape, servo marks in the servo pattern are created in either the +1 or −1 direction as opposed to the opposing discrete values magnetized to the 0 direction of the unwritten magnetic tape, e.g., random particle alignment. Therefore, the usable signal amplitude differential between the discrete servo marks utilizes approximately 50 percent of the total amplitude possible on the magnetic tape. In contrast, creating a remanence of 40 percent in the +1 direction, for example, allows servo marks to be created in the −1 direction. In this manner, the usable signal amplitude differential within the servo pattern is approximately 70 percent of the total amplitude available on the magnetic tape. Therefore, creating a remanence on the magnetic tape may enable fewer errors when writing servo patterns and allow easier distinction between the discrete values of the servo pattern when being read.

In some example of system 10, the amount of remanence created on the magnetic tape may be controlled via a closed feedback mechanism. An amplitude feedback board (not shown) of servo write unit 16 may read the amplitude of the remanence on the magnetic tape entering the servo write unit 16. In turn, the remanence reading may be processed by an interface board or a circuit (e.g., a processor) to determine if the distance between the tape path and the bias magnet needs to be adjusted. If the distance should be adjusted, the circuit may control an electronic stage to change the position of the bias magnet according to the amplitude of the remanence read by the amplitude feedback board. In this manner, system 10 may be capable of automatically adjusting the position of the bias magnet and the associated magnetic field to overcome differences in tape speed, tape components, tape artifacts, or any other variable associated with preparing the biased magnetic tape for writing servo patterns.

Figure 2:
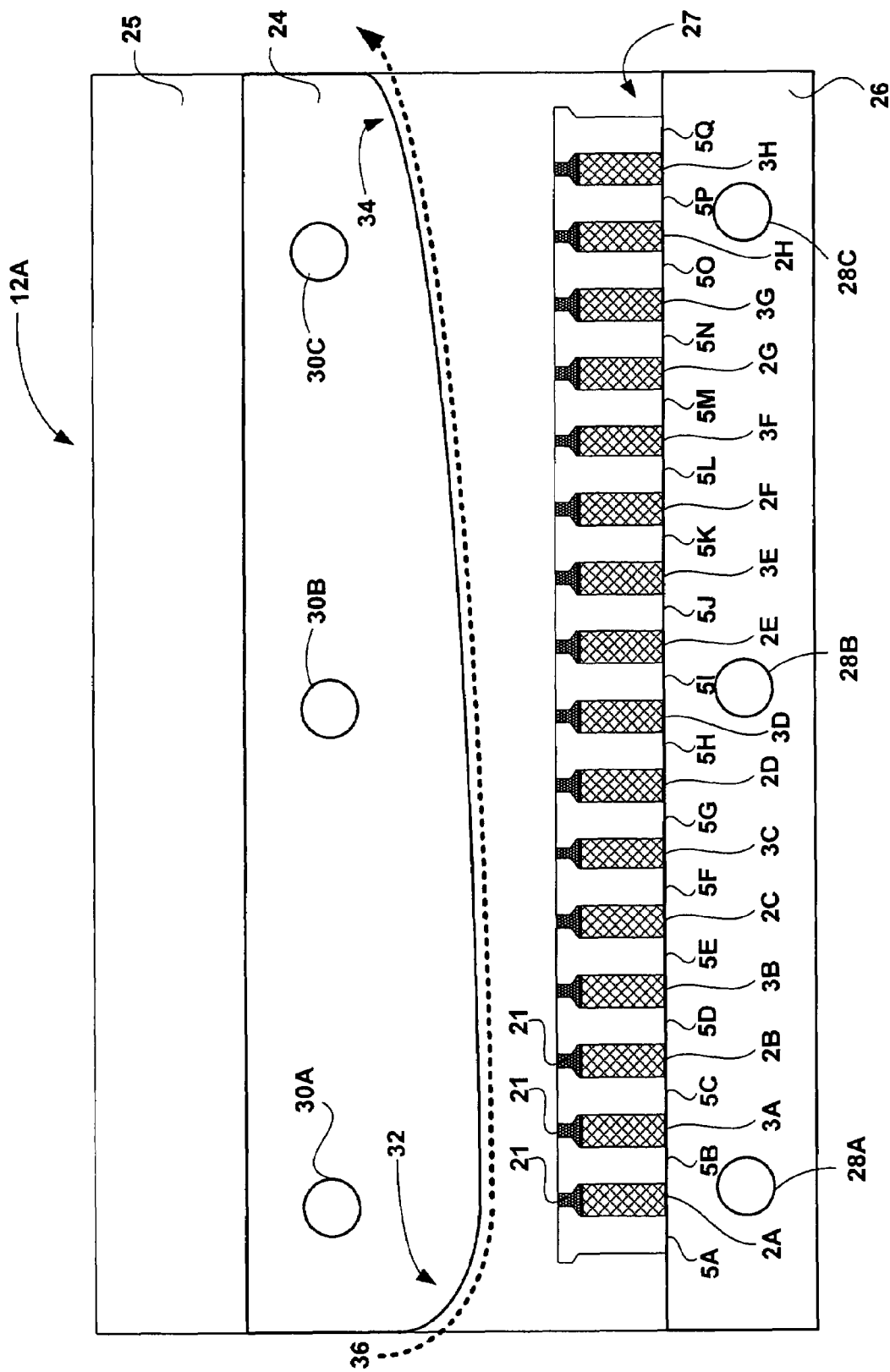
FIG. 2 is a front view of an example erasure unit that creates a remanence on magnetic tape media.

FIG. 2 is a front view of an example erasure unit 12 that creates a remanence on magnetic tape. As shown in FIG. 2, erasure unit 12A is an embodiment of erasure unit 12 of FIG. 1 and includes a plurality of discrete magnetic elements 2A-2H and 3A-3G. Magnetic elements 2A-2H and 3A-3G can be categorized into two sets. Each discrete element in the first set 2A-2H (collectively "set 2") produces a magnetic field having a polarity that is opposite that of the discrete elements in the second set 3A-3G (collectively "set 3"). For example, the magnetic elements of sets 2 and 3 could all be substantially identical, but the magnetic elements in the first set 2 may be oriented differently than the magnetic elements in the second set 3. In this manner, the magnetic elements in the first set 2 can be said to produce a magnetic field having a polarity that is opposite that of the magnetic elements in the second set 3. In addition to sets 2 and 3, bias magnet 3H is a magnetic element that creates a remanence on the magnetic tape after the previous magnetic elements of sets 2 and 3 substantially demagnetize the magnetic tape. While not included as such herein, bias magnet 3H may be considered in second set 3 because of similar polarity to other magnetic elements within set 3.

The magnetic elements in the first and second sets 2 and 3 are positioned to define an alternating configuration. For example, each magnetic element in the first set 2 is proximate to at least one magnetic element in the second set 3, and vice versa. For example, element 2A is proximate to element 3A, and element 3A is proximate to element 2B and so forth. Polar elements 5A-5Q (collectively "polar elements 5") may be positioned between the magnetic elements of sets 2 and 3. For example, polar element 5B may be positioned between proximate magnetic elements 2A and 3A, and polar element 5C may be positioned between magnetic elements 3A and 2B. Polar elements 5P and 5Q are positioned on opposing sides of bias magnet 3H. Polar elements 5 may be constructed of steel, in one example. In another example, polar elements 5 may be constructed of 1018 cold rolled steel. Other types of materials may be used in alternative examples of polar elements 5. In addition, polar elements 5 may be zinc coated to prevent corrosion.

In addition to polar elements 5, erasure unit 12 includes non-magnetic material 21 to fill the gaps between adjacent polar elements and above magnetic elements 2 and 3. Non-magnetic material 21 may prevent dust or debris from collecting on magnetic elements of sets 2 and 3. As an example, non-magnetic material 21 may be constructed of a non-magnetic urethane material. However, any non-magnetic material may be used to construct non-magnetic material 21 as long as the magnetic field from sets 2 and 3 are unaffected.

The invention is not limited by the type of magnets used for sets 2 and 3. Any magnet could be used, including electromagnetic magnets. However, passive magnets having relatively strong magnetic fields are preferred because of simplicity and cost advantages. With a passive magnet, there is no need to incorporate electronic circuitry for producing a driving current. For example, NdFeB bonded magnets produce sufficiently strong magnetic fields, and are relatively inexpensive. Preferably, rare earth magnets may be used for each of the magnetic elements in sets 2 and 3. Rare earth magnets may include any one or more of Neodymium magnets, samarium-cobalt magnets, ceramic magnets, Alnico magnets, and other types commonly known in the art. Bias magnet 3H may be constructed of a magnet with a relatively stronger magnetic field than other magnetic elements of sets 2 and 3. Alternatively, bias magnet 3H may be positioned closer to tape path 36.

In one embodiment, magnetic elements in the first and second sets 2 and 3 produce magnetic fields of decreasing intensity. For example, magnetic elements 2A and 3A may produce magnetic fields of opposite polarity but similar intensity. Magnetic elements 2B and 3B may produce magnetic fields of opposite polarity and intensities less than that of magnetic elements 2A and 3A. Similarly, magnetic elements 2C and 3C may produce magnetic fields of opposite polarity and intensities less than that of magnetic elements 2B and 3B, and so forth. Diminishing field intensity can be achieved by selecting magnetic elements having varying sizes, or by selecting magnetic elements made of differing materials.

In another embodiment, the magnetic elements in the first and second sets 2 and 3 are substantially identical. For example, the intensities of magnetic fields produced by the elements in the first and second sets may be the same, while the polarity of the field is defined by the orientation of the magnetic elements in the erasure unit 10. In this embodiment, the magnetic elements in the first set 2 may be positioned in a first direction, while the magnetic elements in the second set 3 are positioned in a second direction. The effect of diminishing field intensity can be achieved by varying the distance of the magnetic tape from the magnetic elements as the tape travels through erasure unit 12A along tape path 36. Magnetic field strength generally decreases as the distance from the source of the magnetic field increases. Therefore, by defining tape path 36 that curves away from the magnetic elements of sets 2 and 3, the magnetic field seen by the magnetic tape can be decreased even though the magnetic elements produce substantially equivalent magnetic field intensities. Alternatively, polar elements 5 may collectively define a magnetic plane that curves away from tape path 36.

The first and second sets of magnetic elements 2 and 3, along with polar elements 5, can be adhered to mounting block 26, e.g., made of metal, to define an erasure block 27. A tape path block 24 may define one or more tape paths, such as tape path 36. Tape path block 24 and erasure block 27 can be attached or adhered to a servo writing apparatus, a tape cutting apparatus, a tape coating apparatus, or the like. Alternatively, tape path block 24 and erasure block 27 can be attached to a back plate 25, which could be attached or adhered to a servo writing apparatus, a tape cutting apparatus, a tape coating apparatus, or the like. Tape path block 24 and erasure block 27 may be formed with holes 30A-30C and 28A-28C for receiving an attachment device such as a screw, bolt, or the like. Alternatively, tape path block 24 and erasure block 27 could be permanently adhered to back plate 25. Back plate 25 may also be formed with holes (not shown) to facilitate attachment to one or more apparatuses.

Erasure unit 12A is configured such that bias magnet 3H is positioned at the last magnetic element position in erasure block 27. In other words, bias magnet 3H creates the last magnetic field that the magnetic tape passes through along tape path 36. Bias magnet 3H may have similar polarity to magnetic elements of set 3, but some alternative examples may require that the bias magnet may have a polarity similar to the magnetic elements of set 2. While bias magnet 3H is shown as substantially the same shape and size of other magnetic elements of sets 2 and 3, the bias magnet 3H may be configured as a different size and/or shape than sets 2 and 3. For example, bias magnet 3H may have a larger volume and be shaped to have larger width in the direction of tape path 36. In any case, bias magnet 3H creates the remanence over the full width of the magnet tape. Bias magnet 3H may generally have a width between 5 millimeters (mm) and 30 mm. More specifically, bias magnet 3H has a width between 10 mm and 15 mm.

In addition, bias magnet 3H may be positioned at a different distance from mounting block 26 or the adjacent magnetic element 2H. For example, bias magnet 3H may be positioned further from mounting block 26, e.g., closer to tape path 36 than at least one of the magnetic elements of sets 2 and 3. The distance between bias magnet 3H and tape path 36 may be generally between 2.5 mm and 9.5 mm. More specifically, the distance between bias magnet 3H and tape path 36 may be between 3.1 mm and 3.5 mm. These distances also vary with strength of bias magnet 3H.

The size and shape of bias magnet 3H, in conjunction with the position of the bias magnet, determines the effective magnetic field over a portion of tape path 36. In this manner, bias magnet 3H may be configured within erasure unit 12A to create a remanence on the magnetic tape passing through tape path 36. In general, bias magnet 3H may create a remanence greater than at least 20 percent on the magnetic tape. In other examples, bias magnet 3H may create a remanence greater than at least 30 percent on the magnetic tape, or more preferably, a remanence greater than at least 40 percent. In alternative embodiments, erasure unit 12A may include multiple bias magnets 3H in order to achieve the remanence percentages described herein. The multiple bias magnets may be positioned as needed at the end of tape path 36.

Tape path block 24 is formed to define tape path 36 that curves away from the magnetic elements as the magnetic tape passes through erasure unit 12A. The desired strength of the magnetic field, as seen along tape path 36 can be made to decrease substantially exponentially until the magnetic tape reaches the magnetic field produced by bias magnet 3H. The effect of substantially exponential decay of field strength can be simplified by presuming that the field from succeeding elements is some percentage, e.g., 90%, of the preceding element. Exponential decay can be achieved as follows.

From the Karlqvist model of a conventional gapped head of gap length g:

$$H_x(x, y) = \frac{H_g}{2\pi}\left(\tan^{-1}\left(\frac{x+\frac{g}{2}}{y}\right) - \tan^{-1}\left(\frac{x-\frac{g}{2}}{y}\right)\right) \quad (1)$$

where $H_g$ represents the deep gap field.

The maximum value of $H_x$ occurs at x=0:

$$H_x(0, y) = \frac{H_g}{2\pi}\left(\tan^{-1}\left(\frac{\frac{g}{2}}{y}\right) - \tan^{-1}\left(\frac{-\frac{g}{2}}{y}\right)\right), \quad (2)$$

which simplifies to:

$$H_x(0, y) = \frac{H_g}{\pi}\tan^{-1}\left(\frac{g}{2y}\right). \quad (3)$$

Again, the intent is to produce an exponentially decaying field in succeeding gaps or:

$$H(\chi) = H_0 e^{-\alpha\chi} \quad (4)$$

$$H_x(0, y) = \frac{H_g}{\pi}\tan^{-1}\left(\frac{g}{2y(\chi)}\right) \quad (5)$$

$$H_0 e^{-\alpha\chi} = \frac{H_g}{\pi}\tan^{-1}\left(\frac{g}{2y(\chi)}\right) \quad (6)$$

$$\left(H_0 < \frac{H_g}{2}\right)$$

$$\frac{\pi H_0 e^{-\alpha\chi}}{H_g} = \tan^{-1}\left(\frac{g}{2y(\chi)}\right) \quad (7)$$

$$\tan\left(\frac{\pi H_0 e^{-\alpha\chi}}{H_g}\right) \quad (8)$$

where $H_0$ represents the magnitude of the field of the first element, e.g., element 2A, as seen along tape path 36 (FIG. 2). Typically the value of $H_0$ will be several times the coercivity of the media ($H_c$) being erased.

$$y(\chi) = \frac{g}{2\tan\left(\frac{\pi H_0 e^{-\alpha\chi}}{H_g}\right)} \quad (9)$$

Now values can be assigned to the arbitrary constants ($\alpha$ and $H_0$).

$$\text{Define: } \frac{H_0}{H_g} \equiv \beta, \left(0 < \beta < \frac{1}{2}\right) \quad (10)$$

X can represent the lateral position of the final gap.

$$\frac{H(X)}{H(0)} \equiv \gamma \quad (11)$$

From equation (4):

$$e^{-\alpha\chi} = \gamma \quad (12)$$

or:

$$e^{\alpha\chi} = \frac{1}{\gamma} \quad (13)$$

$$\alpha X = \ln\left(\frac{1}{\gamma}\right). \quad (14)$$

Thus:

$$\alpha = \frac{1}{X}\ln\left(\frac{1}{\gamma}\right) \quad (15)$$

or:

$$\alpha = \ln\left(\left(\frac{1}{\gamma}\right)^{\frac{1}{X}}\right) \quad (16)$$

Substituting (10) and (16) into (9) produces:

$$y(\chi) = \frac{g}{2\tan\left(\pi\beta e^{-\chi\left(\left(\frac{1}{\gamma}\right)^{\frac{1}{X}}\right)}\right)} \quad (17)$$

$$y(\chi) = \frac{g}{2\tan\left(\pi\beta e^{-\chi\ln\left(\left(\frac{1}{\gamma}\right)^{\frac{\chi}{X}}\right)}\right)} \quad (18)$$

$$y(\chi) = \frac{g}{2\tan\left(\pi\beta e^{\ln\left(\gamma^{\frac{\chi}{X}}\right)}\right)} \quad (19)$$

$$y(\chi) = \frac{g}{2\tan(\pi\beta\gamma^{\frac{\chi}{X}})}. \quad (20)$$

This function can be machined into a tape path block 24 to define the portion of tape path 36 which is used to control the distance of the tape to the magnetic elements.

After the magnetic elements of sets 2 and 3 substantially demagnetize the magnetic tape, bias magnet 3H applies a magnetic field to the magnetic tape to create the remanence on the magnetic tape before the magnetic tape leaves tape path block 24. The distance between bias magnet 3H and tape path 36 may be determined based upon a few equations directed to the magnetization of the magnetic tape from a magnetic field. The force (F) of the magnetism between two attracting surfaces in close proximity is defined as:

$$F = \frac{AB^2}{(2\mu_0)} \quad (21)$$

where A is the cross-sectional area of the magnet, B is the magnetic field between the magnet and magnetized surface, and $\mu_0$ is the universal constant called the permeability of space ($4p\times10^{-7}$).

The field strength from the bias magnet 3H is determined by the inverse cube law for magnetism. The transfer of the magnetic field from the magnet to another magnetic susceptible substance is given by the equation:

$$\chi_m = \frac{M}{H} \quad (22)$$

where $x_m$ is the magnetic susceptibilities, M is the induced magnetization, and H is the magnetic field intensity.

It is also desirable to define tape path 36 so that magnetic tape will "fly" over the surface as it feeds through erasure unit 12A. The tape may have a fly height of approximately 20 microinches (0.508 micrometers). An inlet region (indicated by numeral 32) can be machined adjacent to the exponential curve to promote flyability. In addition, an outlet region could be machined in the region indicated by numeral 34. The inlet and outlet regions may each be defined by an arc of a circle. Larger circle radiuses tend to enhance flyability, but also tend to increase the size of erasure unit 12A. A radius of 1.25 inches (3.175 centimeters) may be sufficiently large to promote flyability along tape path 36 in erasure unit 12A if the tape is moving faster than approximately 2 meters per second and the flyable surface is polished as described below.

As mentioned, the inlet region 32 may be defined by the equation of a circle. At the point defined by the center for the first magnetic element 2A, the tangent of the circle is made equal to the tangent of the exponential curve defined above. The center of the circle may be defined by the center of hole 30A.

For example, given the circle:

$$(x-xc)^2+(y-yc)^2=R^2, \quad (23)$$

where the center of the coordinate system is defined by hole 30A, and the Y-Axis is defined by the center of the first magnetic element 2A, find xc and yc such that the circle is tangent to the function y=f(x) at the point xp,yp.

The slope of f(x) is given by the derivative f'(x).
The circle has a slope given by its derivative $$\frac{dy}{dx} = -\frac{x-xc}{y-yc}$$

The condition of tangency requires that:

$$\frac{dy}{dx} = f'(x). \quad (24)$$

Thus, $$f'(x) = \frac{x-xc}{y-yc} \quad (25)$$

and at the point of tangency, $$f'(x) = -\frac{x-xc}{y-yc}. \quad (26)$$

Given the relationship:

$$(xp-xc)^2+(yp-yc)^2=R^2. \quad (27)$$

Equation (24) can be rearranged as:

$$xp-xc=-(yp-yc)f'(xp) \quad (28)$$

and equation (28) can be substituted into (27) to yield:

$$[-(yp-yc)f'(xp)]^2 + (yp-yc)^2 = R^2 \quad (29)$$

$$(yp-yc)^2(1+f'(xp)^2) = R^2 \quad (30)$$

$$(yp-yc^2) = \frac{R^2}{(1+f'(xp)^2)} \quad (31)$$

$$yp-yc = \pm\frac{R}{\sqrt{1+f'(xp)^2}}. \quad (32)$$

Then:

$$yc = yp \pm \frac{R}{\sqrt{1+f'(xp)^2}}. \quad (33)$$

Equation (31) can be substituted into equation (27) to yield $$(xp - xc)^2 + \frac{R^2}{(1+f'(xp)^2)} = R^2 \quad (34)$$

or:

$$(xp - xc)^2 = R^2 \left(1 - \frac{1}{1+f'(xp)^2}\right) \quad (35)$$

$$(xp - xc)^2 = R^2 \left(\frac{f'(xp)^2}{1+f'(xp)^2}\right) \quad (36)$$

$$xp - xc = \pm \frac{Rf'(xp)}{\sqrt{1+f'(xp)^2}} \quad (37)$$

$$xc = xp \mp \frac{Rf'(xp)}{\sqrt{1+f'(xp)^2}} \quad (38)$$

$$yc = yp \pm \frac{Rf'(xp)}{\sqrt{1+f'(xp)^2}} \quad (33)$$

$$(x - xc)^2 + (y - yc)^2 = R^2 \quad (23)$$

$$(y - yc)^2 = R^2 - (x - xc)^2 \quad (39)$$

$$y - yc = \pm \sqrt{R^2 - (x - xc)^2} \quad (40)$$

$$y = yc \pm \sqrt{R^2 - (x - xc)^2}. \quad (41)$$

This function can be machined into a tape path block 24 to define the inlet region 32 of tape path 36.

Advantages during the assembly process of erasure unit 12A may by achieved by defining inlet region 32 with an equation of a circle, the center of which is defined by hole 30A. During assembly, tape path block 24 can be attached to back plate 25 via an attachment mechanism inserted through hole 30A. Tape path block 36 can then be rotated relative to back plate 25 so that the tape path is optimized for erasure of a particular type of magnetic tape. Once the desired position of tape path block 36 is determined, additional attachment mechanisms can be inserted through other holes on tape path block 24 to ultimately define the position of tape path block 24 relative to the sets of magnetic elements 2 and 3.

To further enhance flyability, the surface of tape path block 24 along tape path 36 can be made with a slightly crowned surface, e.g., on the order of 0.0001 to 0.001 inches (2.54 micrometers to 25.4 micrometers). As the tape flies across tape path block 24, the edges of the tape may tend to sag. The amount of edge sag generally has a magnitude on the order of the fly height. If the edges drag along the surface of the tape path block 24, the edges may create wear on tape path block 24 that can cause problems with the operation of erasure unit 12A. Thus, by constructing tape path block 24 to exhibit a slightly crowned surface along tape path 36, the effects of edge sag as the tape flies the tape path block 24 may be minimized.

In one embodiment, tape path block 24 is made out of a material that is non-magnetic, relatively easy to machine, and wear-resistant (or amendable to having a non-magnetic wear coating applied to it). The material may also exhibit low coefficient of friction relative to the tape, so that the tape can move across the material when it is not flying, e.g., when the movement of the tape starts and stops. A Teflon-impregnated hardcoat-anodized aluminum is an example of a material that satisfies these criteria. In addition, the surface of the material may be highly polished with a surface finish of approximately 4 microinches (1 micrometer) or less.

Figure 3:
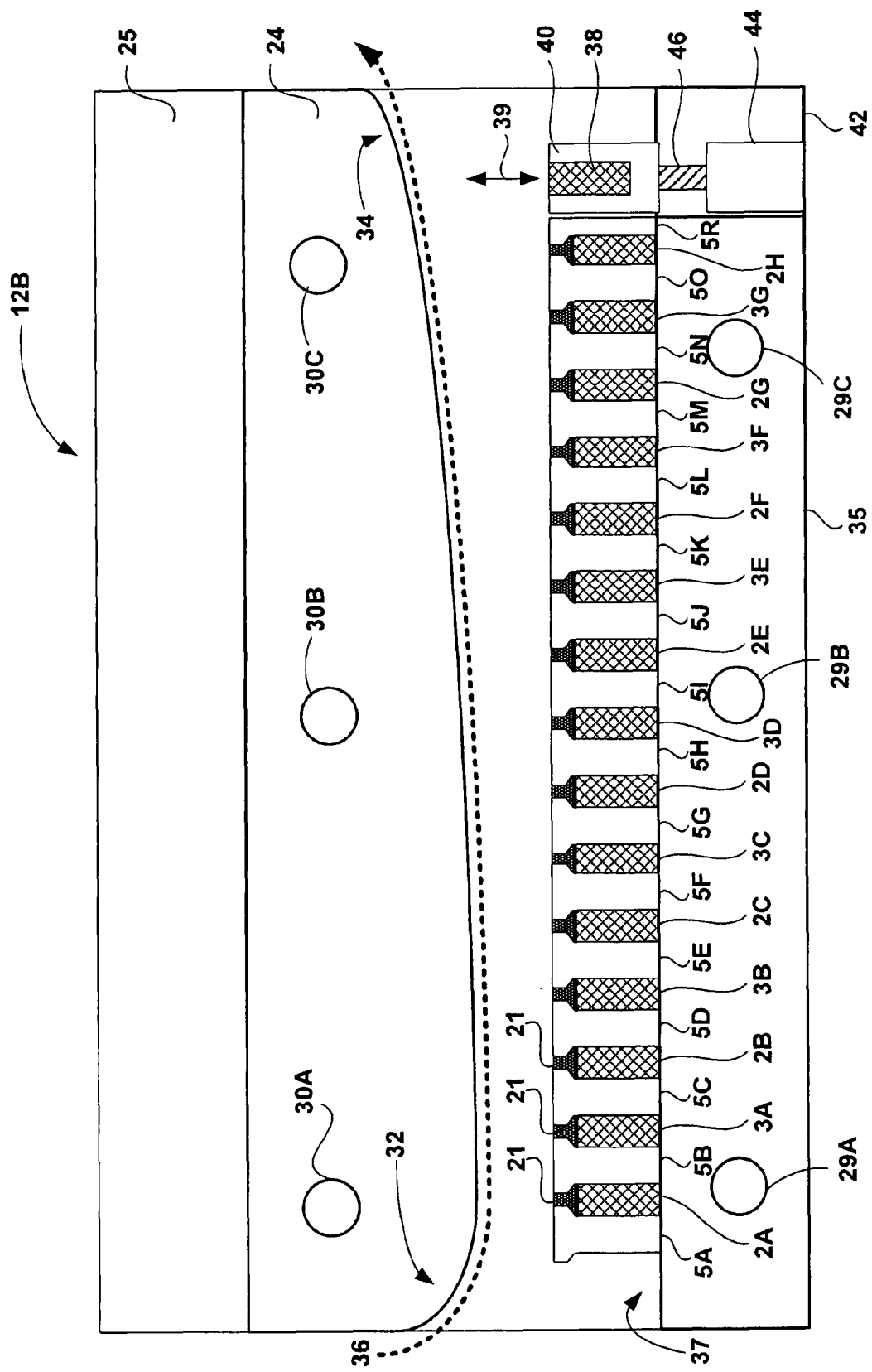
FIG. 3 is a front view of an example erasure unit with a movable bias magnet that creates a remanence on magnetic tape media.

FIG. 3 is a front view of an example erasure unit 12B with a movable bias magnet 38 that creates a remanence on magnetic tape. Erasure unit 12B is similar to erasure unit 12A of FIG. 2, but erasure unit 12B has the capability to adjust the position of bias magnet 38. As shown in FIG. 3, erasure unit 12B includes a plurality of discrete magnetic elements 2A-2H and 3A-3G. Magnetic elements 2A-2H and 3A-3G can be categorized into two sets. Each discrete element in the first set 2A-2H (collectively "set 2") produces a magnetic field having a polarity that is opposite that of the discrete elements in the second set 3A-3G (collectively "set 3"). Polar elements 5A-5R (collectively "polar elements 5") may be positioned between the magnetic elements of sets 2 and 3. Polar element 5R is positioned next to polar element 40 and may be shaped differently than the rest of polar elements 5. Non-magnetic material 21 is also provided to fill the gaps between adjacent polar elements 5.

Erasure unit 12B also includes mounting block 35 that is attached to sets 2 and 3 and polar elements 5 to define erasure block 37. Tape path block 24 defines tape path 36. In some examples, tape path block 24 and erasure block 37 may be formed with holes 30A-30C and 29A-29C for receiving an attachment device such as a screw, bolt, or the like. Alternatively, tape path block 24 and erasure block 37 could be permanently adhered to back plate 25.

In addition to sets 2 and 3, bias magnet 38 is a magnetic element that creates a remanence on the magnetic tape after the previous magnetic elements of sets 2 and 3 substantially demagnetize the magnetic tape. While not included as such herein, bias magnet 38 may be considered in second set 3 because of similar polarity to other magnetic elements within set 3. However, bias magnet 38 is adjustable to set the desired magnet field to tape path 36. Bias magnet 38 is attached to stage 40, and stage 40 is attached to shaft 46. Shaft 46 is coupled to motor 44 adhered to block 42. Block 42 may be attached to back plate 25 and/or mounting block 35. In other embodiments, stage 40 may be a polar element or include a polar element similar to polar elements 5. In some examples, bias magnet 38 may be located closer to or further away from erasure block 37 than shown in FIG. 3.

Erasure unit 12B is configured such that bias magnet 38 is positioned at the end of erasure block 37. In other words, bias magnet 38 creates the last magnetic field that the magnetic tape passes through along tape path 36. Bias magnet 38 may have similar polarity to magnetic elements of set 3, but some alternative examples may require that the bias magnet may have a polarity similar to the magnetic elements of set 2. While bias magnet 38 is shown as substantially the same shape and size of other magnetic elements of sets 2 and 3, the bias magnet 38 may be configured as a different size and/or shape than sets 2 and 3. For example, bias magnet 38 may have a larger volume and be shaped to have larger width in the direction of tape path 36. In other examples, bias magnet 38 may have a smaller volume and a larger surface area in a plane orthogonal to arrows 39. In any case, bias magnet 38 creates the remanence over the full width of the magnet tape. Bias magnet 38 may generally have a width between 5 mm and 30 mm. More specifically, bias magnet 38 has a width between 10 mm and 15 mm.

In addition, bias magnet 38 may be positioned at a different distance from mounting block 35 or the adjacent magnetic element 2H. For example, bias magnet 38 may be positioned further from mounting block 26, e.g., closer to tape path 36 than at least one of the magnetic elements of sets 2 and 3. The distance between bias magnet 38 and tape path 36 may be generally between 2.9 mm and 3.4 mm. More specifically, the distance between bias magnet 38 and tape path 36 may be between 3.02 mm and 3.26 mm. These distances also vary with strength of bias magnet 38. Bias magnet 38 may be constructed of a material with a different magnetic field than that of sets 2 and 3, e.g., a relatively stronger magnetic field.

Stage 40 moves in the linear directions indicated by arrows 39 in order to position bias magnet 38 as needed to create the desired remanence on the magnetic tape passing along tape path 36. Motor 44 may be a linear step motor or other discrete mechanism that rotates or moves shaft 46. In one example, motor 44 rotates a threaded shaft 46 to cause stage 40 to move with the threads of shaft 46. In another example, shaft 46 is coupled to a gear (not shown) within motor 44, and the gear pushes shaft 46 in the directions of arrows 39. Other mechanisms for moving stage 40 may also be used. In any case, the position of bias magnet 38 may be adjusted with respect to tape path 36.

The size and shape of bias magnet 38, in conjunction with the position of the bias magnet, determines the effective magnetic field over a portion of tape path 36. In this manner, bias magnet 38 may be configured within erasure unit 12B to create a remanence on the magnetic tape passing through tape path 36. In general, bias magnet 38 may create a remanence greater than at least 20 percent on the magnetic tape. In other examples, bias magnet 38 may create a remanence greater than at least 30 percent on the magnetic tape, or more preferably, a remanence greater than at least 40 percent. Stage 40 allows bias magnet 38 to achieve any of the remanence levels desired on the magnetic tape by moving the magnet closer to tape path 36 to increase the remanence created on the magnetic tape. In alternative embodiments, erasure unit 12B may include multiple bias magnets 38 in order to achieve the remanence percentages described herein. The multiple bias magnets may be positioned as needed at the end of tape path 36.

As described with regard to FIG. 1, motor 44 may allow system 10 to automatically control the amount of remanence created on the magnetic tape. By measuring the remanence in servo write unit 16 or at some other location within system 10, the appropriate distance between tape path 36 and bias magnet 38 may be calculated. System 10 may then control motor 44 to move stage 40 to the appropriate position. The position of stage 40 may be determined based upon the activity of motor 44 and/or a sensor attached to stage 40. In alternative examples, motor 44 may be replaced with a manual adjustment knob that requires a user to manually rotate to change the position of bias magnet 38.

Figure 4:
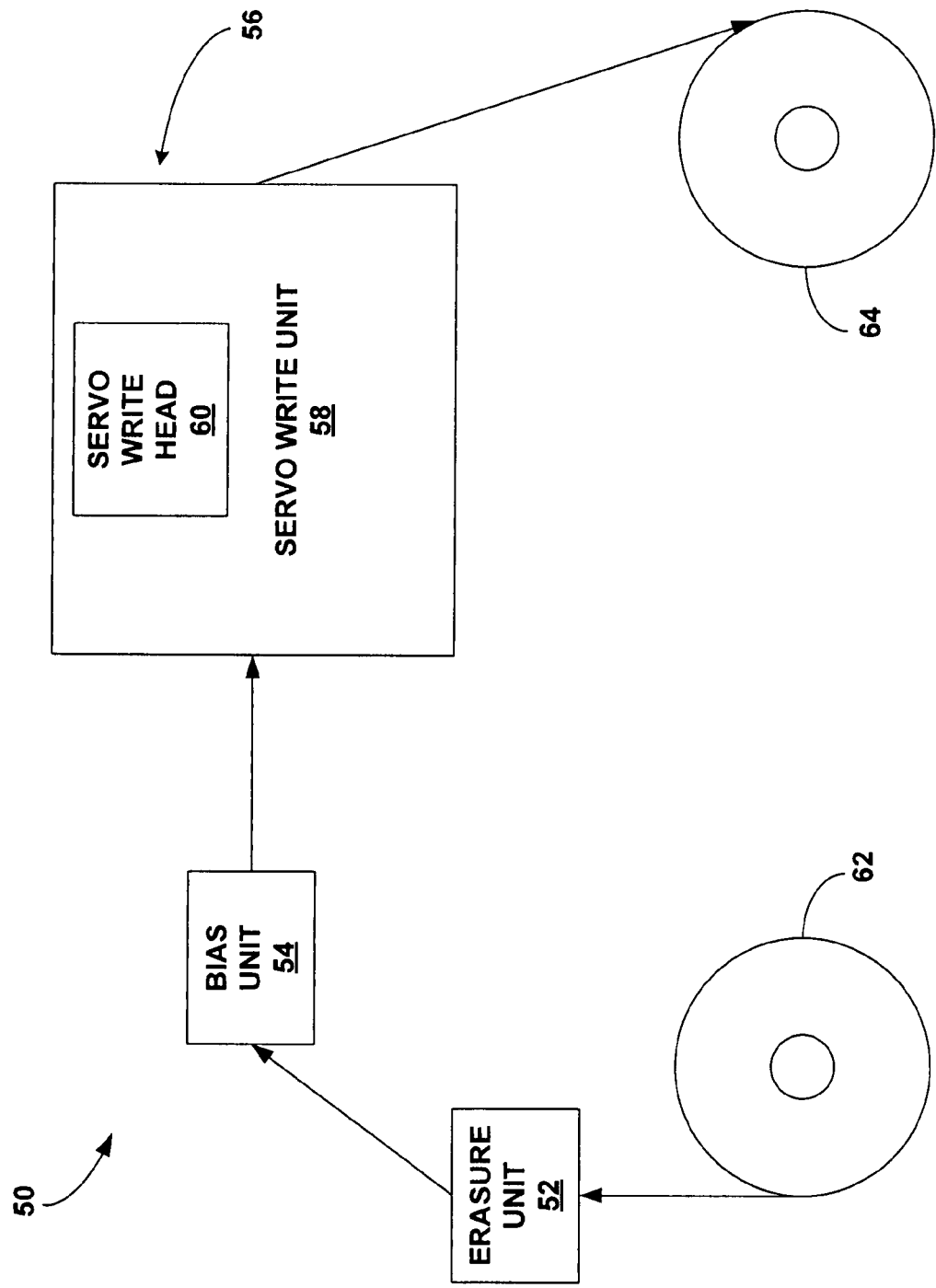
FIG. 4 is a conceptual illustration of an example servo writing system including a bias unit that creates a remanence on magnetic tape media.

FIG. 4 is a conceptual illustration of an example system 50 including bias unit 54 that creates a remanence on magnetic tape media. System 50 is similar to system 10 of FIG. 1. However, system 50 creates a remanence on the magnetic tape with bias unit separate from erasure unit 52. As shown in FIG. 4, system 50 includes servo writing system 56 in conjunction with erasure unit 52, bias unit 54, and spools 62 and 64. System 50 creates a remanence on magnetic tape from spool 62 before writing servo patterns on the magnetic tape with servo write head 60. The magnetic tape feeds out of spool 62 and through erasure unit 12. Erasure unit 52 includes a plurality of magnetic elements that substantially demagnetize, e.g., degauss, the magnetic tape from spool 62. The magnetic tape leaving erasure unit 52 is substantially demagnetized, e.g., particles of the magnetic tape are randomly magnetized, before it enters bias unit 54. Erasure unit 52 may be similar to erasure unit 12A of FIG. 2, but there is no bias magnet within erasure unit 52.

In addition to erasure unit 52, bias unit 54 creates a remanence on the magnetic tape before the magnetic tape enters servo write unit 58. Bias unit 54 includes a bias magnet (not shown) that creates a remanence on the magnetic tape. The bias magnet may be configured to apply a magnetic field sufficient to create a remanence of appropriate magnitude. The biased magnetic tape subsequently feeds into servo writing unit 58. In other examples, erasure unit 52 may apply a small remanence to the magnetic tape before bias unit 54 creates a larger remanence to the magnetic tape.

Servo writing unit 58 may implement one or more servo write heads 60 to write servo patterns on the magnetic tape. The magnetic tape then feeds out of servo writing unit 58, and is re-spooled onto spool 64. Servo writing system 58 may also include various motors (not shown) and guides (not shown) for moving the tape through servo writing system 56, various vacuum units (not shown) to ensure that the magnetic tape is taut throughout the servo writing system 56, and various cleaning stations (not shown) to wipe the magnetic tape clean. In addition, system 50 may include various motors attached to spools 62 and/or 64, guides to keep the magnetic tape aligned in the tape path, and housings to support the operation of system 50.

The remanence created on the magnetic tape may improve the quality of servo patterns written on the magnetic tape and the ability to read the servo patterns. As discussed above, the remanence may increase the amplitude differential between the discrete values of the servo pattern when compared to magnetic tape without a remanence. In general, system 50 may create a remanence of at least 20 percent on the full width of the magnetic tape. In other embodiments, system 50 may create a remanence of at least 30 percent on the magnetic tape. Preferably, system 50 may create a remanence of at least 40 percent on the magnetic tape. The amount of remanence created on the magnetic tape is a function of the strength of the magnetic field applied to the magnetic tape by the bias magnet. As mentioned previously, the remanence percentage is the percent of the total magnetization possible of the particles of the magnetic tape, such that 100 percent magnetization may be equivalent to particles fully magnetized in one direction of the magnetic tape. In some embodiments, erasure unit 52 may include an adjustable stage that adjusts the distance between the bias magnet and the magnetic tape. In this manner, the amount of remanence created on the magnetic tape may be easily defined by the manufacture of erasure unit 52 or the user of system 50.

In some example of system 50, the amount of remanence created on the magnetic tape may be controlled via a closed feedback mechanism. An amplitude feedback board (not shown) of servo write unit 58 may read the amplitude of the remanence on the magnetic tape entering the servo write unit 58. In turn, the remanence reading may be processed by an interface board or a circuit (e.g., a processor) to determine if the distance between the tape path and the bias magnet within bias unit 54 needs to be adjusted. If the distance should be adjusted, the circuit may control an electronic stage to change the position of the bias magnet according to the amplitude of the remanence read by the amplitude feedback board. In this manner, system 50 may be capable of automatically adjusting the position of the bias magnet and the associated magnetic field to overcome differences in tape speed, tape components, tape artifacts, or any other variable associated with preparing the biased magnetic tape for writing servo patterns.

Figure 5:
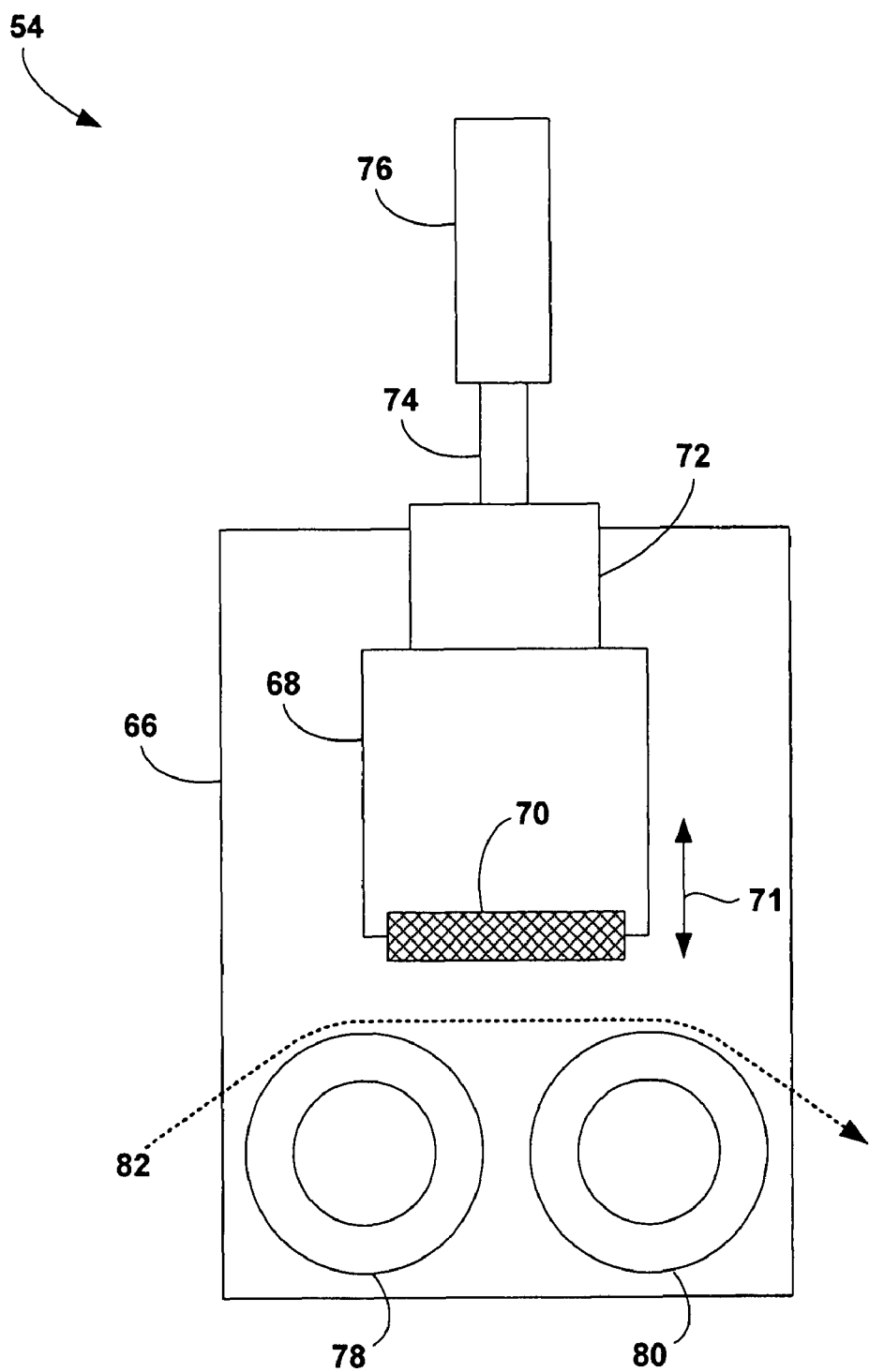
FIG. 5 is a front view of an example unit that facilitates the adjustment of the distance between the bias magnet and the magnetic tape media.

FIG. 5 is a front view of an example bias unit 54 that facilitates the adjustment of the distance between bias magnet 70 and the magnetic tape media. As shown in FIG. 5, bias unit 54 includes plate 66, block 68, bias magnet 70, stage 72, shaft 74, and handle 76. Bias unit 54 also includes guides 78 and 80 to define tape path 82. Plate 66 provides a mounting platform to attach stage 72. Stage 72 provides a mechanism to adjust the position of block 68 and attached bias magnet 70 in the linear directions of arrows 71. A user may rotate handle 76 in order to rotate threaded shaft 74 and cause the linear movement of stage 72. While manual adjustment of the bias magnet positions is described in regard to bias unit 54, other examples of the bias unit may include motorized or other electronically controlled mechanisms to adjust stage 72 as desired by the user. Similar to erasure unit 12B of FIG. 3, system 50 may include a closed feedback loop to automatically adjust the position of bias magnet 70.

Guides 78 and 80 may be rotating wheels that rotate with magnetic tape moving along tape path 82. However, other examples of guides 78 and 80 may include a substantially smooth surface that does not move with the magnetic tape but allows the magnetic tape to slide easily over the guide surfaces. Guides 78 and 80 define tape path 82 which is stationary with regard to plate 66. In alternative examples, guides 78 and 80 may be configured differently than shown in FIG. 5 or allowed to move with respect to bias magnet 70 in order to alter the remanence created on the magnetic tape.

Bias magnet 70 may be similar to bias magnet 38 of FIG. 3. In addition, bias magnet 70 may be any type of magnetic element, such as a rare earth magnet or electromagnet. The size and shape of bias magnet 70, in conjunction with the position of the bias magnet in the direction of arrows 71, determines the effective magnetic field over a portion of tape path 82. In this manner, bias magnet 70 may be configured within bias unit 54 to create a remanence on the magnetic tape passing through tape path 82. Bias magnet 70 creates the remanence over the full width of the magnet tape. Bias magnet 70 may generally have a width between 5 millimeters mm and 30 mm. More specifically, bias magnet 70 has a width between 10 mm and 15 mm. The distance between bias magnet 70 and tape path 82 may be generally between 2.9 millimeters mm and 3.4 mm. More specifically, the distance between bias magnet 70 and tape path 82 may be between 3.02 mm and 3.26 mm. These distances also vary with strength of bias magnet 70.

In general, bias magnet 70 may create a remanence greater than at least 20 percent on the full width of the magnetic tape. In other examples, bias magnet 70 may create a remanence greater than at least 30 percent on the magnetic tape, or more preferably, a remanence greater than at least 40 percent. Stage 72 allows bias magnet 70 to achieve any of the remanence levels desired on the magnetic tape by moving the magnet closer to tape path 82 to increase the remanence created on the magnetic tape. In alternative embodiments, bias unit 54 may include multiple bias magnets 70 in order to achieve the remanence percentages described herein. The multiple bias magnets may be positioned as needed with respect to tape path 82.

If stage 72 is configured to be controlled electrically, handle 76 may be replaced with a motor. The motor would allow system 10 to automatically control the amount of remanence created on the magnetic tape. By measuring the remanence in bias unit 54, servo write unit 58 or at some other location within system 50, the appropriate distance between tape path 82 and bias magnet 70 may be calculated. System 50 may then control the motor to move stage 72 to the appropriate position. The position of stage 72 may be determined based upon the activity of the motor and/or a sensor attached to stage 72.

Figure 6:
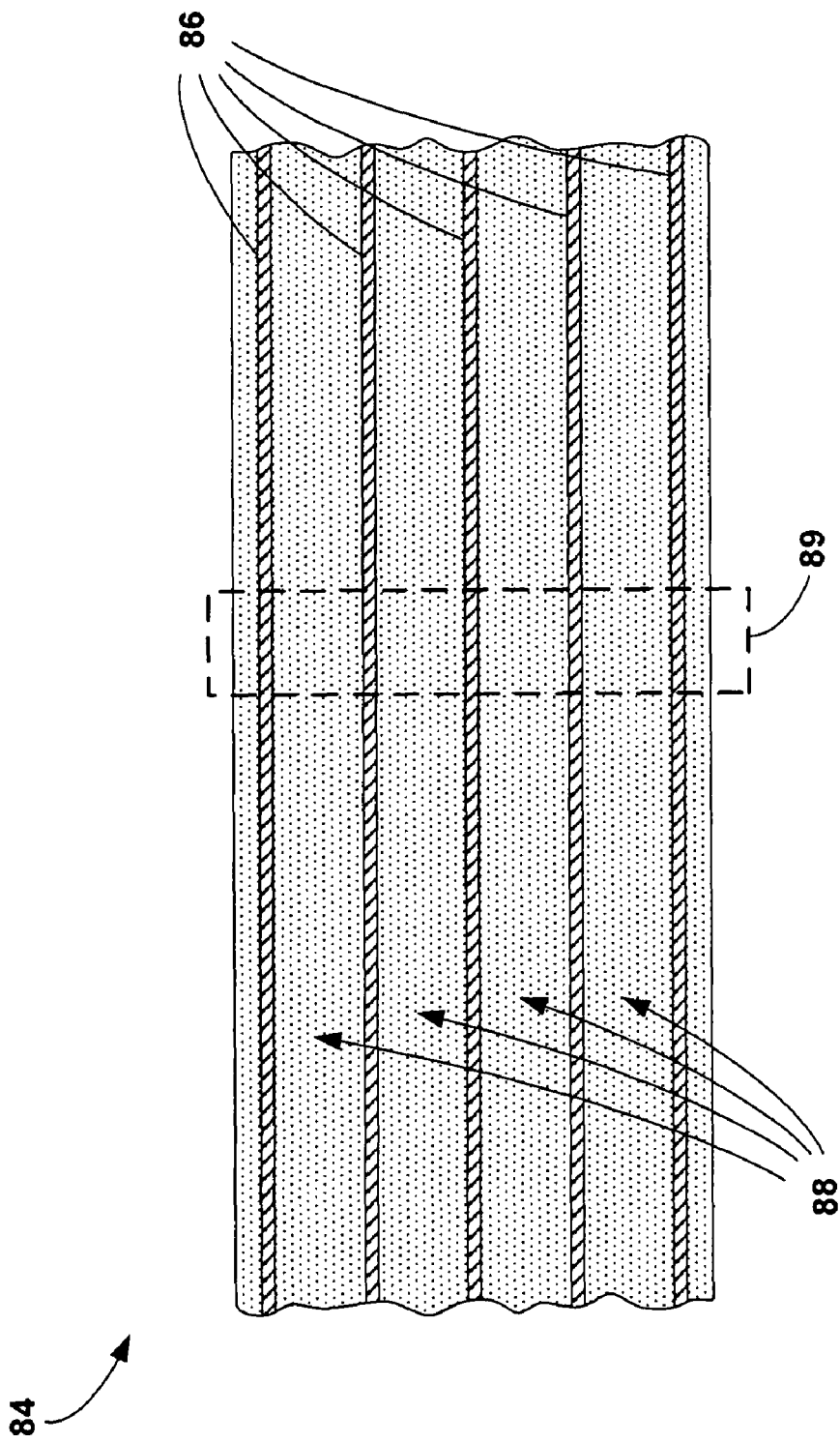
FIG. 6 is a conceptual illustration of an example magnetic tape media.

FIG. 6 is a conceptual illustration of an example magnetic tape media 84. As shown in FIG. 6, magnetic tape 84 is shown with multiple servo tracks 86 separated by each of the data bands 88. The multiple servo tracks 86 create the overall servo pattern of servo tracks, and individual servo marks create each of the servo tracks 86. Servo tracks 86 are used by data write heads to identify the position of magnetic tape 84. Any of the bias magnets described herein apply a direct current (DC) bias to the full width 89 of magnetic tape 84. In this manner, the applied bias creates the remanence over the full width 89 of magnetic tape 84 to increase the amplitude of servo patterns 86 written on the magnetic tape. The remanence may not affect any of data bands 88.

As described above, the remanence allows for a greater amplitude difference between the discrete digital values used for the servo patterns. With no remanence on the magnetic tape, servo marks in the servo pattern are created in either the +1 or −1 direction as opposed to the opposing discrete values magnetized to the 0 direction of the unwritten magnetic tape, e.g., random particle magnetization. Therefore, the usable signal amplitude differential between the discrete servo marks utilizes approximately 50 percent of the total amplitude possible on the magnetic tape. In contrast, creating a remanence of 40 percent in the +1 direction, for example, allows servo marks to be created in the −1 direction. In this manner, the usable signal amplitude differential within the servo pattern is approximately 70 percent of the total amplitude available on the magnetic tape. Therefore, creating a remanence on the magnetic tape may enable fewer errors when writing servo patterns and allow easier distinction between the discrete values of the servo pattern when being read.

The remanence created on magnetic tape 84, either in servo tracks 86 or data bands 88, may be measurable. As mentioned previously, the remanence may be at least 20 percent of the total possible magnetization of magnetic tape 84. In other embodiments, magnetic tape 84 may have a remanence of at least 30 percent. Preferably, magnetic tape 84 may have a remanence of at least 40 percent. After servo tracks 86 are written, data bands 88 retain the detectable remanence. However, the remanence may not affect writing data to any of data bands 88. While four data bands 88 and 5 servo tracks 86 are illustrated in FIG. 6, magnetic tape 84 may have any number of data bands and servo tracks of any desirable width.

Magnetic tape 84 may be manufactured according to a multiple step process. For example, a wide roll of tape is typically coated with the magnetic material in a coating process. After the coating is dried, the tape may then be cut in a cutting process to realize magnetically coated tape having the desired width. The tape may then be spooled and then erased in a degaussing process. Finally, the tape may be written with servo patterns, and possibly spooled into a tape cartridge or the like. An erasure unit 12 or 52 and/or bias unit 54 according to the invention could be easily incorporated into one of these manufacturing processes so that a separate degaussing and biasing process is avoided. For example, erasure unit 12 or bias unit 52 could form part of a tape cutting system, a tape spooling system, a tape coating system, or a servo writing system.

Figure 7:
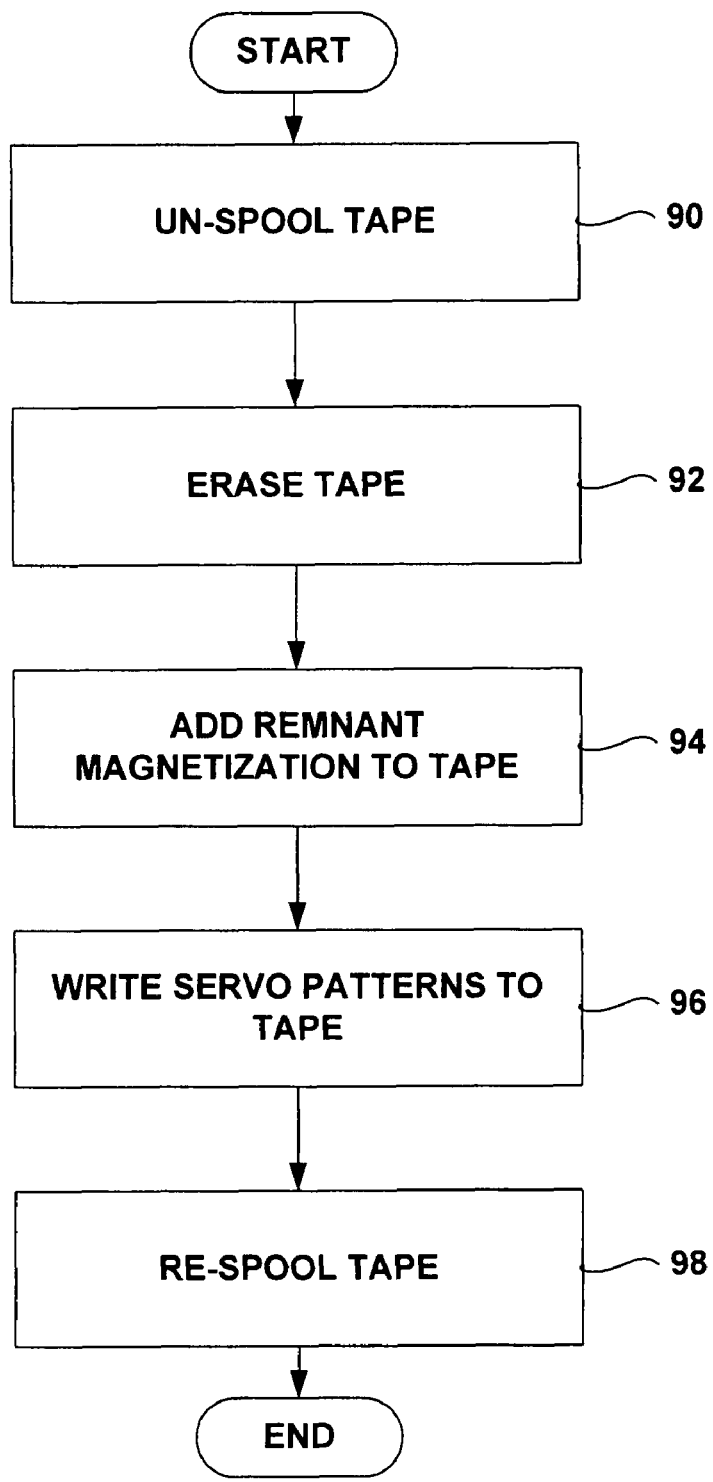
FIG. 7 is an example flow diagram illustrating a technique for creating a remanence on magnetic tape media.

FIG. 7 is an example flow diagram illustrating a technique for creating a remanence on magnetic tape media. The technique of FIG. 7 will be described with elements of system 50, but elements of system 10 may also be employed in other examples. As shown in FIG. 7, creating a remanence in magnetic tape is started by un-spooling the magnetic tape from spool 62 (90). Erasure unit 52 erases, or demagnetizes, the magnetic tape (92). Next, bias unit 54 creates the desired remanence magnetization to the full width of the magnetic tape (94). The biased magnetic tape is then sent to servo write unit 58 where servo write head 60 writes servo patterns to the magnetic tape (96). Writing servo patterns to the magnetic tape may include writing multiple servo tracks separated by data bands in the magnetic tape. Finally, system 50 re-spools the magnetic tape (98). The process of FIG. 7 may be used on newly manufactured magnetic tape or magnetic tape anywhere in its life cycle.

A number of embodiments of the present invention have been described. For example, a relatively simple design of an erasure unit with a bias magnet to create a remanence on magnetic tape has been described. Nevertheless, various modifications may be made without departing from the scope of the invention. For example, the bias magnet could be implemented much later in the lifetime of the magnetic tape, and could be implemented for use with magnetic tape cartridges or the like. In addition, the magnetic elements described herein could use electromagnets rather than passive magnets or any other device capable of generating an appropriate magnetomotive force. In general, the invention may be implemented any time it is desirable to create a remanence to magnetic tape. Accordingly, other embodiments are within the scope of the following claims.

The invention claimed is:

1. A method comprising:
substantially demagnetizing a magnetic tape medium by passing the magnetic tape medium through an erasure unit, wherein the erasure unit includes:
a first set of magnetic elements, and
a second set of magnetic elements, the magnetic elements in the first and second sets positioned to define an alternating configuration, wherein the magnetic elements in the first and second sets of magnetic elements respectively produce magnetic fields of opposite polarity;
creating a remnant magnetization of at least 20 percent on a full width of the magnetic tape medium by passing the magnetic tape medium through a bias unit after substantially demagnetizing the magnetic tape medium; and
writing a plurality of servo patterns on the remnant magnetized magnetic tape medium.

2. The method of claim 1, further comprising moving the bias unit closer to the magnetic tape medium to increase the remnant magnetization created on the magnetic tape medium.

3. The method of claim 1, further comprising moving the bias unit further from the magnetic tape medium to decrease the remnant magnetization created on the magnetic tape medium.

4. The method of claim 1, wherein creating the remnant magnetization comprises creating the remnant magnetization of at least 30 percent on the full width of the magnetic tape medium.

5. The method of claim 1, wherein creating the remnant magnetization comprises creating the remnant magnetization of at least 40 percent on the full width of the magnetic tape medium.

6. The method of claim 1, further comprising:
un-spooling the magnetic tape medium prior to passing the magnetic tape medium through the erasure unit; and
spooling the magnetic tape medium after writing the plurality of servo patterns on the remnant magnetized magnetic tape medium.

7. The method of claim 1, wherein the magnetic tape medium follows a tape path, the tape path:
starting at a first spool;
passing through the erasure unit;
passing near a bias magnet of the bias unit;
passing through a servo writing unit after passing near the bias magnet; and
ending at a second spool.

8. A method comprising:
substantially demagnetizing a magnetic tape medium by passing the magnetic tape medium through an erasure unit, wherein the erasure unit includes:
a first set of magnetic elements, and
a second set of magnetic elements, the magnetic elements in the first and second sets positioned to define an alternating configuration, wherein the magnetic elements in the first and second sets of magnetic elements respectively produce magnetic fields of opposite polarity;
creating a remnant magnetization on a full width of the magnetic tape medium by passing the magnetic tape medium through a bias unit after substantially demagnetizing the magnetic tape medium;
measuring the remnant magnetization created on the magnetic tape medium;
based on the measured remnant magnetization, calculating a distance between the bias unit and the magnetic tape medium to achieve a desired remnant magnetization;
controlling a motor to adjust a position of the bias unit in response to the calculation; and
writing a plurality of servo patterns on the remnant magnetized magnetic tape medium.

9. The method of claim 8, further comprising moving, by at least the motor, the bias unit closer to the magnetic tape medium to increase the remnant magnetization created on the magnetic tape medium.

10. The method of claim 8, further comprising moving, by at least the motor, the bias unit further from the magnetic tape medium to decrease the remnant magnetization created on the magnetic tape medium.

11. The method of claim 8, wherein creating the remnant magnetization on the full width of the magnetic tape medium comprises creating the remnant magnetization of at least 20 percent on the full width of the magnetic tape medium.

12. The method of claim 8, wherein creating the remnant magnetization on the full width of the magnetic tape medium comprises creating the remnant magnetization of at least 30 percent on the full width of the magnetic tape medium.

13. The method of claim 8, wherein creating the remnant magnetization on the full width of the magnetic tape medium comprises creating the remnant magnetization of at least 40 percent on the full width of the magnetic tape medium.

14. The method of claim 8, wherein the magnetic tape medium follows a tape path, the tape path:
starting at a first spool;
passing through the erasure unit;
passing near the bias unit;
passing through a servo writing unit after passing near the bias unit; and
ending at a second spool.

15. A method comprising:
moving a magnetic tape medium along a tape path;
substantially demagnetizing the magnetic tape medium by passing the magnetic tape medium through an erasure unit along the tape path, wherein the erasure unit includes:
 a first set of magnetic elements, and
 a second set of magnetic elements, the magnetic elements in the first and second sets positioned to define an alternating configuration, wherein the magnetic elements in the first and second sets of magnetic elements respectively produce magnetic fields of opposite polarity;
adjusting a distance between a bias unit and the tape path;
creating a remnant magnetization on a full width of the magnetic tape medium by passing the magnetic tape medium through the bias unit along the tape path after substantially demagnetizing the magnetic tape medium, wherein the remnant magnetization is at least 20 percent according to the adjusted distance; and
writing a plurality of servo patterns on the remnant magnetized magnetic tape medium.

16. The method of claim 15, wherein adjusting the distance between the bias unit and the tape path comprises moving the bias unit closer to the magnetic tape medium to increase the remnant magnetization created on the magnetic tape medium.

17. The method of claim 15, wherein adjusting the distance between the bias unit and the tape path comprises moving the bias unit further from the magnetic tape medium to decrease the remnant magnetization created on the magnetic tape medium.

18. The method of claim 15, wherein the remnant magnetization is at least 30 percent according to the adjusted distance.

19. The method of claim 15, wherein the remnant magnetization is at least 40 percent according to the adjusted distance.

20. The method of claim 15, wherein the magnetic tape medium follows the tape path, the tape path:
 starting at a first spool;
 passing through the erasure unit;
 passing near the bias unit;
 passing through a servo writing unit after passing near the bias unit; and
 ending at a second spool.

\* \* \* \* \*